US011567292B2

(12) United States Patent
Li et al.

(10) Patent No.: US 11,567,292 B2
(45) Date of Patent: Jan. 31, 2023

(54) LENS MODULE

(71) Applicant: AAC Optics Solutions Pte. Ltd., Singapore (SG)

(72) Inventors: Gang Li, Shenzhen (CN); Jin Zhang, Shenzhen (CN); Linzhen Li, Shenzhen (CN); Jiliang Lu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 267 days.

(21) Appl. No.: 17/017,729

(22) Filed: Sep. 11, 2020

(65) Prior Publication Data

US 2021/0072496 A1   Mar. 11, 2021

(30) Foreign Application Priority Data

Sep. 11, 2019  (CN) .......................... 201910860832.3

(51) Int. Cl.
*G02B 7/09* (2021.01)
*G02B 27/64* (2006.01)

(52) U.S. Cl.
CPC ............. *G02B 7/09* (2013.01); *G02B 27/646* (2013.01)

(58) Field of Classification Search
CPC ... G02B 7/09; G02B 7/00; G02B 7/08; G02B 7/10; G02B 27/646; G02B 27/64; G03B 5/00; G03B 13/36; G03B 2205/0069; G11B 7/09; H02K 41/02; H02K 41/035; H02K 41/0354; H02K 41/0274; H04N 5/225; H04N 5/232; H05K 2201/09027; H05K 2201/10151; H05K 2201/10121
See application file for complete search history.

(56) References Cited

U.S. PATENT DOCUMENTS

2015/0135703 A1*  5/2015  Eddington ............... G03B 5/00
                                                                  60/528

* cited by examiner

*Primary Examiner* — Darryl J Collins
*Assistant Examiner* — Tamara Y. Washington
(74) *Attorney, Agent, or Firm* — W&G Law Group (57) ABSTRACT

The invention says a lens module including a frame, a first circuit board arranged on the frame, a lens base for mounting a lens, a support device for supporting the lens base on the first circuit board, and a driving device connected between the first circuit board and the lens base. The frame includes oppositely arranged first side walls and oppositely arranged second side walls connected between the first side walls. The driving device includes shape memory alloy wires each being provided with two ends connected to the frame, and a driving end positioned between the two ends. The driving ends are supported on the lens base. The lens module said by the invention can further achieve miniaturization on the basis of reducing the difficulty in product assembly.

11 Claims, 7 Drawing Sheets

LENS MODULE

FIELD OF THE PRESENT INVENTION

The invention relates to the field of optical lenses, in particular to a lens module with optical image stabilization function.

DESCRIPTION OF RELATED ART

At present, in the field of optical image stabilization, more and more shape memory alloy (SMA) wire-based actuating devices are adopted.

In the prior art, one end of a shape memory alloy brake device is connected between a movable device and a support device through various crimp elements. In the arrangement way, two ends of the same conductive wire of an SMA brake are separately fixed on two different parts (a movable platform and a support block), so that the difficulty in product assembly is increased, especially the SMA brake is not favorable to circuit arrangement and overall miniaturization when applied to an image pickup optical system.

SUMMARY OF THE INVENTION

One of the objects of the present invention is to provides a lens module with miniaturization on the basis of reducing the difficulty in product assembly.

Therefore, the invention says a lens module including a frame, a first circuit board arranged on the frame, a lens base for mounting a lens, a support device for supporting the lens base on the first circuit board, and a driving device connected between the first circuit board and the lens base. The frame includes oppositely arranged first side walls and oppositely arranged second side walls connected between the first side walls. The driving device includes shape memory alloy wires each being provided with two ends connected to the frame, and a driving end positioned between the two ends. The driving ends are supported on the lens base. The lens module said by the invention can further achieve miniaturization on the basis of reducing the difficulty in product assembly.

As an improvement, wire clips are arranged on the first side walls and the second side walls respectively; the wire clips are clamped between the frame and the first circuit board; and the ends of the shape memory alloy wires are respectively fixed by the wire clips and are electrically connected to the first circuit board through the wire clips.

As an improvement, the lens module includes at least two shape memory alloy wire; wherein the shape memory alloy wires are symmetrically arranged on the periphery of the lens base; the lens base is provided with hook parts corresponding to the driving ends; and the hook parts sleeve the driving ends in a matching manner.

As an improvement, the frame and the lens base both are in a square form; the hook parts are formed at corners at one side, close to the first circuit board, of the lens base.

As an improvement, the support device comprises at least two suspending wires extending along an optical axis direction; support parts are formed at one side of the lens base far away from the first circuit board; one end of each suspending wire is fixed to the first circuit board and the other end is fixed to one support part; and the suspending wires are symmetrically arranged on the periphery of the lens base and suspend the lens base in the frame.

As an improvement, the lens base is in a square form; and the suspending wires are correspondingly arranged at for corners of the lens base.

As an improvement, the four suspending wires all are perpendicular to the first circuit board.

As an improvement, the lens base comprises a lens support for mounting the lens and a base for supporting the lens support; the lens support is movably connected relative to the base in the optical axis direction; the support parts and the hook parts are formed at two opposite ends of the base respectively; the lens module further comprises an autofocusing mechanism; the autofocusing mechanism comprises a second circuit board, a conductive wire and a focusing shape memory alloy wire; the second circuit board is arranged on the base and is perpendicular to the first circuit board; two conductive support parts are arranged at one side, close to the second circuit board, of the base; the first circuit board and the second circuit board are electrically connected through the two conductive support parts and the suspending wires close to the two conductive support parts; a signal control conductive wire is also electrically connected between the first circuit board and the second circuit board; the conductive wire is arranged at one side of the first circuit board away from the base; and the focusing shape memory alloy wire is electrically connected with the second circuit board.

As an improvement, one surface of the frame toward the first circuit board is provided with concave portions at the positions corresponding to the wire clips; and the wire clips are fixed into the corresponding concave portions.

As an improvement, the wire slots are formed in the hook parts; and the driving ends of the shape memory alloy wires are accommodated into the wire slots.

As an improvement, each shape memory alloy wire is L-shaped.

As an improvement, an included angle formed by each shape memory alloy wire is greater than 90 degrees and smaller than 110 degrees.

As an improvement, a blocking board is formed at one side of the base far away from the first circuit board, in a manner of extending towards the lens support; an accommodation groove is formed in one side, far away from the first circuit board, of the lens support along the optical axis direction; an elastic element is accommodated into the accommodation groove; one end of the elastic element is accommodated and fixed into the accommodation groove; and the other end extends out of the lens support and is propped against the blocking board.

As an improvement, the focusing shape memory alloy wire is V-shaped and comprises two fixing ends connected to the support parts and a V-shaped driving end positioned between the two fixing ends; a driving convex part is arranged on the lens support and comprises a V-shaped end part; and the V-shaped driving end of the focusing shape memory alloy wire and the V-shaped end part of the lens support are in fit contact.

As an improvement, a ball assembly for guiding the lens support to slide relative to the base along the optical axis direction of the lens is arranged between the lens support and the base.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present invention.

FIG. 1 is an exploded view of a lens module provided by an exemplary embodiment of the invention.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present invention more apparent, the present invention is described in further detail together with the figure and the embodiment. It should be understood the specific embodiment described hereby is only to explain the invention, not intended to limit the invention.

It should be noted that when an element is referred to as being fixed to another element, it can be directly on the other element, or intervening elements may also be present. When one element is considered to be connected to another element, it may be directly connected to the other element or intervening elements may be present at the same time. The terms, such as "vertical", "horizontal", "left" and "right" and similar expressions used herein are for the purpose of illustration only.

Unless defined otherwise, all technical and scientific terms used herein have the same meaning as commonly understood by those skilled in the art to which the invention belongs. The terms used in the description of the invention herein are for the purpose of describing particular embodiments only and are not intended to be limiting of the invention. The term "and/or" used herein may include any and all combinations of one or more relevant items listed.

Figure 12:
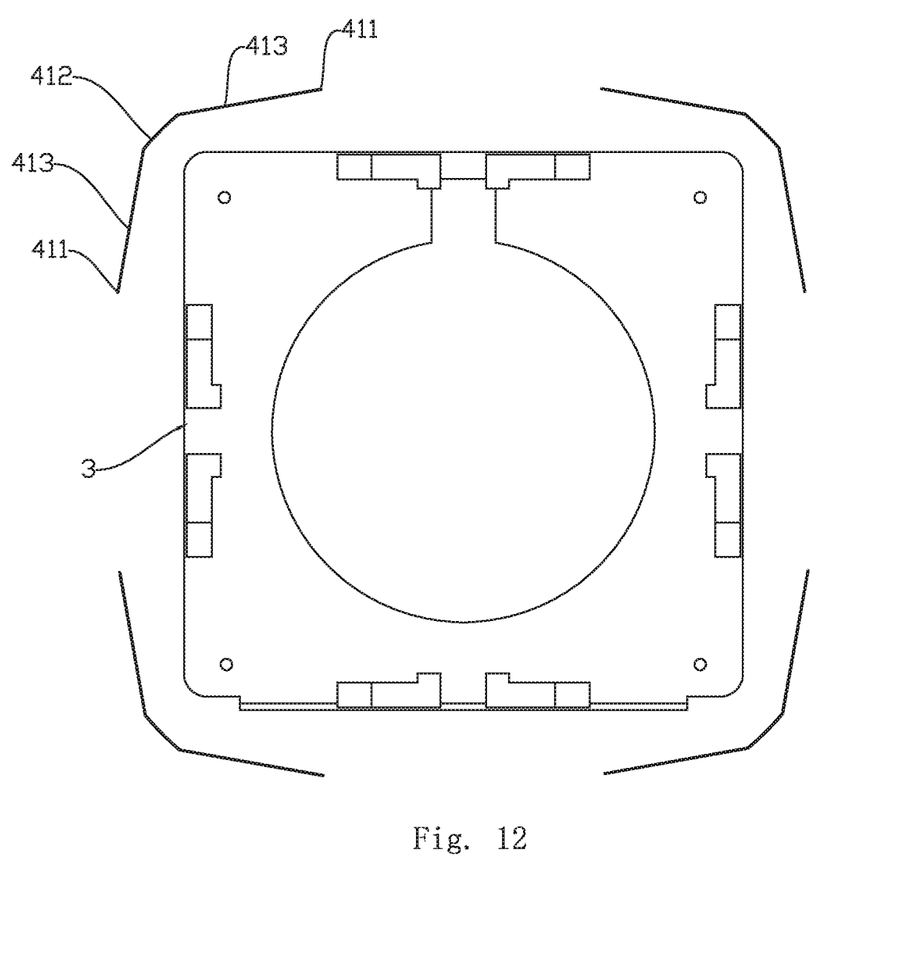
FIG. 12 is an exploded view of the lens module with the base removed.

As shown in FIGS. 1 to 6, a lens module comprises a frame 2, a first circuit board 3 arranged on the frame 2, a lens base 6 for mounting a lens, a support device for supporting the lens base 6 on the first circuit board 3, and a driving device connected between the first circuit board 3 and the lens base 6. The frame 2 is in an annular form and is arranged around the periphery of the lens base; the driving device is used for driving the lens base 6 to move relative to the frame 2 in a direction perpendicular to an optical axis of the lens. The frame 2 comprises oppositely arranged first side walls 22a and oppositely arranged second side walls 22b connected between the first side walls 22a; and the first side walls 22a and the second side walls 22b are enclosed into a ring. Referring to FIG. 12, the driving device comprises shape memory alloy wires 41. Each shape memory alloy wire 41 comprises two ends 411 connected to the frame 2, and a driving end 412 positioned between the two ends, wherein one end 411 is fixed to one first side wall 22a and the other end 411 is fixed to one adjacent second side wall 22b; and the driving ends are supported on the lens base 6. Specifically, wire clips 23 are arranged on the first side walls 22a and the second side walls 22b.

Figure 9:
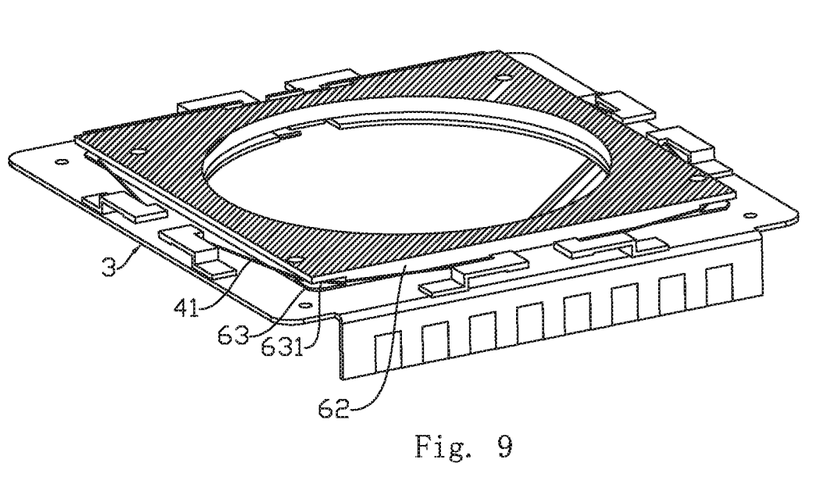
FIG. 9 is a cross-sectional view of the lens module with the substrate and suspending wire removed.

The wire clips 23 are clamped between the frame 2 and the first circuit board 3. The ends of the shape memory alloy wires 41 are respectively fixed by the wire clips 23 and are electrically connected to the first circuit board 3 through the wire clips 23. At least two shape memory alloy wires 41 are included and are symmetrically arranged at the periphery of the lens base 6. Referring to FIG. 9, the lens base 6 is provided with hook parts 63 corresponding to the driving ends, and the hook parts 63 sleeve the driving ends in a matching manner. In the embodiment, the frame 2 and the lens base 6 both are in a square form; and the hook parts 63 are formed at corners at one side, close to the first circuit board 3, of the lens base 6. It should be noted that FIG. 1 further shows a substrate 8 located below the first circuit board 3 and a housing 9 used for covering the frame 2 and the lens base 6.

Referring to FIG. 12, preferably, the shape memory alloy wires 41 are L-shaped in general. Each shape memory alloy wire further comprises two extension sections 413 connected between the driving end 412 and two ends 411. One included angle is formed between two extension sections 413 and is greater than 90 degrees and smaller than 110 degrees. Preferably, the included angle is between 90 degrees and 100 degrees.

Figure 3:
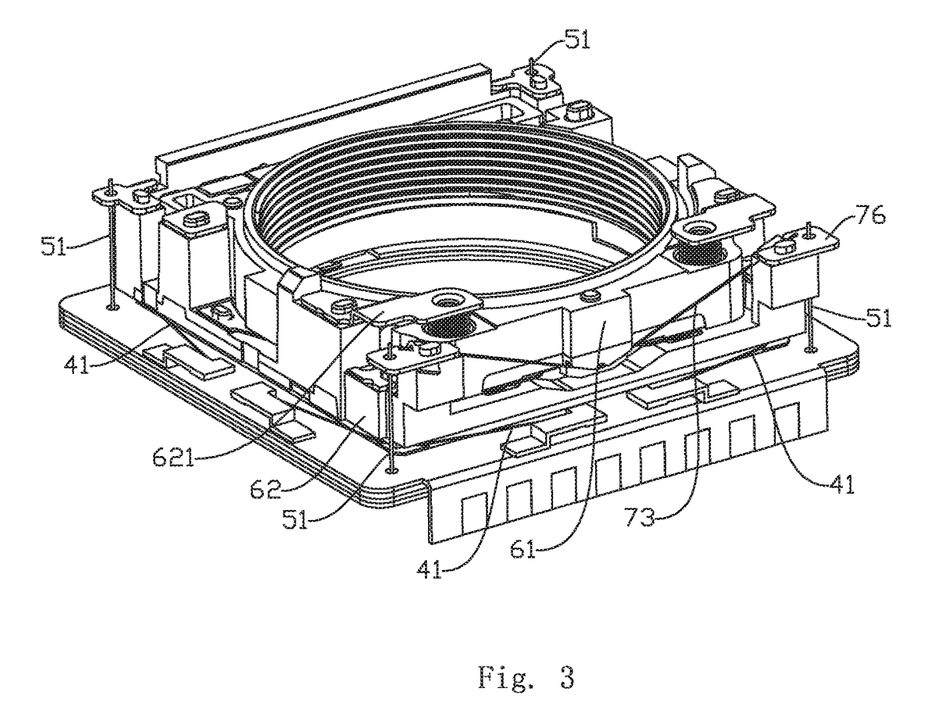
FIG. 3 is an isometric view of the lens module with a frame removed.
Figure 4:
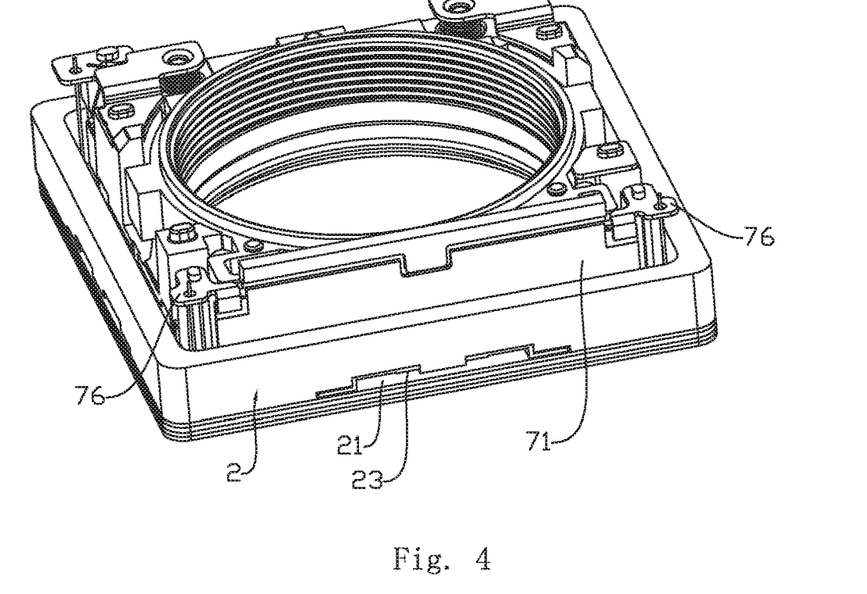
FIG. 4 is similar to FIG. 2 but from another aspect
Figure 5:
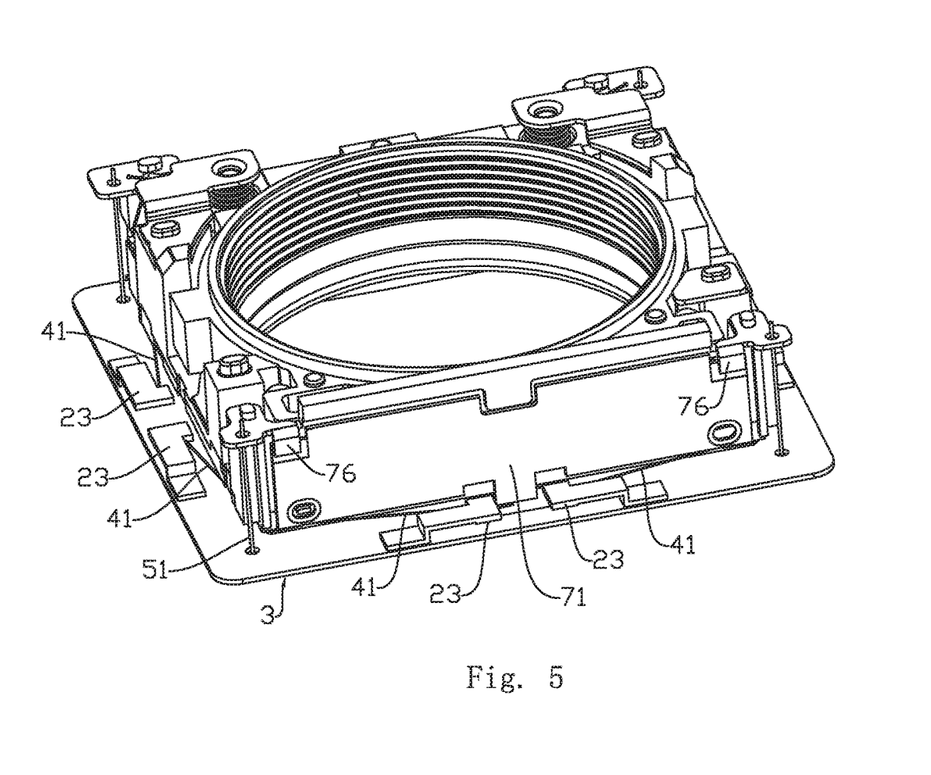
FIG. 5 is an isometric view of the lens module with the frame and a substrate removed.
Figure 6:
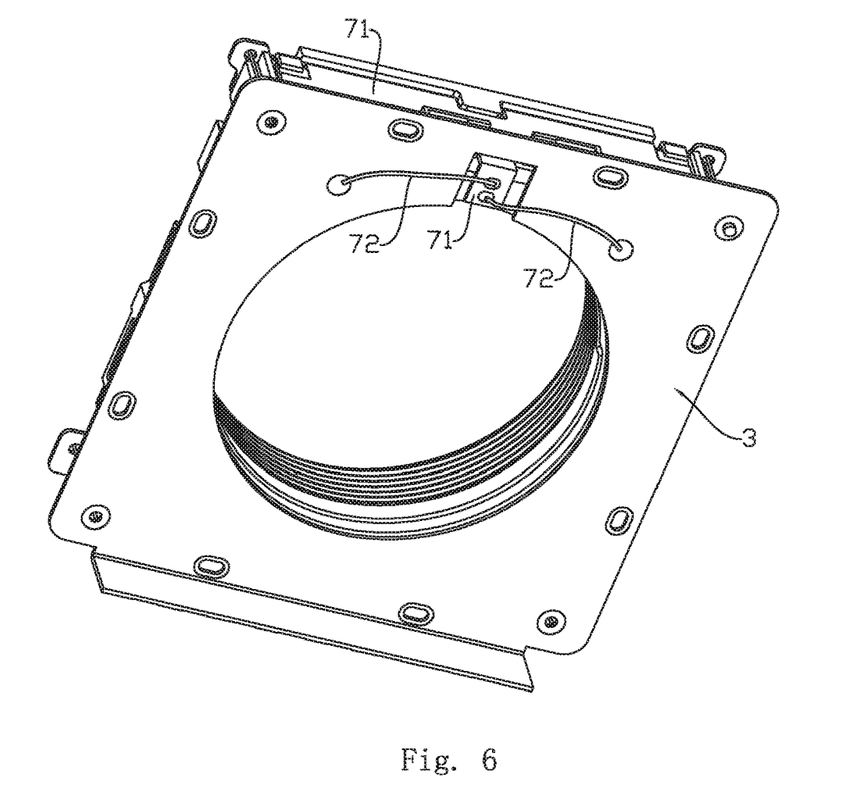
FIG. 6 is similar to FIG. 5 but from another aspect.

Referring to FIG. 3, in the embodiment, the support device comprises at least two suspending wires 51 extending along the optical axis direction. Support parts 76 are formed at one side, far away from the first circuit board 3, of the lens base 6. One end of each suspending wire 51 is fixed to the first circuit board 3 and the other end is fixed to one support part 76. The suspending wires 51 are symmetrically arranged at the periphery of the lens base 6 and suspend the lens base 6 in the frame 2. Preferably, the lens base 6 is in a square form and the suspending wires 51 are correspondingly arranged at four corners of the lens base 6. Preferably, the four suspending wires 51 all are perpendicular to the first circuit board 3. The suspending wires 51 have certain rigidity and elasticity to play a supporting role and to provide restoring force to the lens base 6; and the material of the suspending wires 51 can be preferably a copper alloy.

In the invention, for the same size of imaging systems (the same size of imaging systems mean that circular holes formed in the lens base 6 are the same in diameter, that is, the outside diameters of the lenses are the same), the hook parts 63 are positioned at four bottom corners of the lens base 6, so that, compared with the situations that the hook parts 63 are positioned at other places of the lens base 6, especially in the middle parts of four edges of the lens base 6, the size of the lens base 6 can be made smaller. For the same size of imaging systems, in FIG. 10, the size of the lens base 6 is favorable to miniaturization. In addition, in the invention, two ends of each shape memory alloy wire 41 are connected to the first circuit board 3, thereby facilitating circuit routing and achieving power supply and control of an image stabilization system by only one layer of circuit board.

Figure 2:
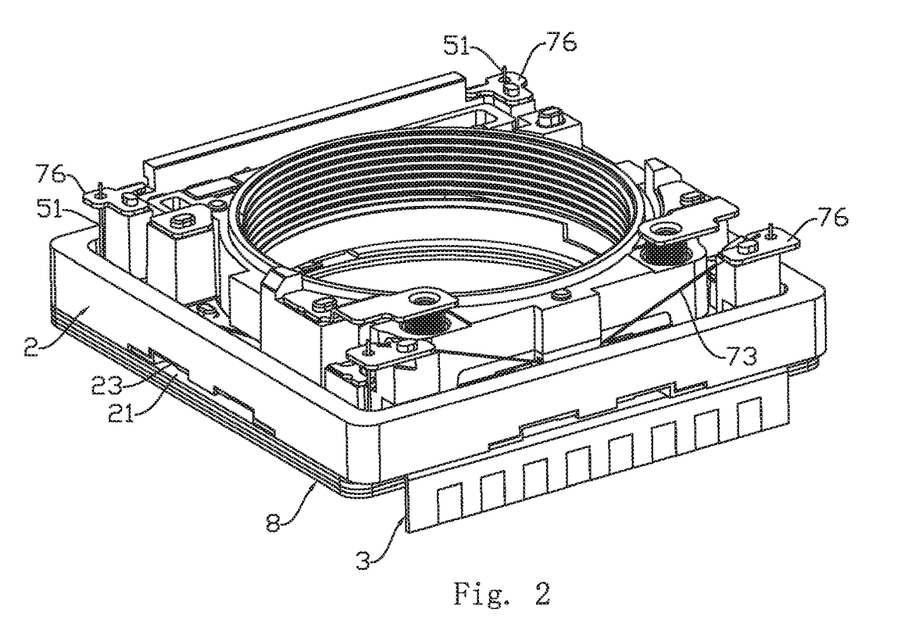
FIG. 2 is an isometric view of the lens module, with a housing removed after assembly.
Figure 7:
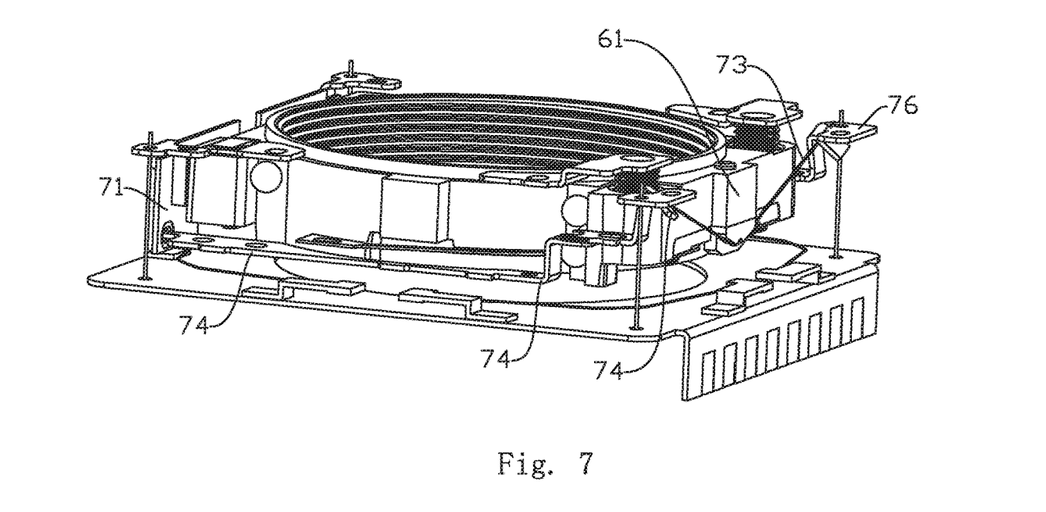
FIG. 7 is similar to FIG. 3 with the substrate and a base removed, from another aspect.

As a preferred embodiment, referring to FIGS. 2, 7 and 9, the lens base 6 comprises a lens support 61 used for mounting the lens, and a base 62 used for supporting the lens support 61. The lens support 61 is movably connected relative to the base 62 in the optical axis direction. The support parts 76 and the hook parts 63 are formed at two opposite ends of the base 62 respectively. Referring to FIGS. 3 to 6, the lens module further comprises an autofocusing mechanism. The autofocusing mechanism comprises a second circuit board 71, a conductive wire 72 and a focusing shape memory alloy wire 73. The second circuit board 71 is arranged on the base 62 and is perpendicular to the first circuit board 3.

Two support parts 76 at one side, close to the second circuit board 71, of the base 62 are conductive, the first circuit board 3 and the second circuit board 71 are electrically connected through the two conductive support parts 76 and the suspending wires 51 close to the two conductive support parts 76. A signal control conductive wire 72 is also electrically connected between the first circuit board 3 and the second circuit board 71. The conductive wire 72 is arranged at one side, away from the 62, of the first circuit board 3. The focusing shape memory alloy wire 73 is electrically connected with the second circuit board 71. In this arrangement way, extra plane space does not need to be occupied, so that the size of the lens module can be reduced and miniaturization is further facilitated.

Figure 8:
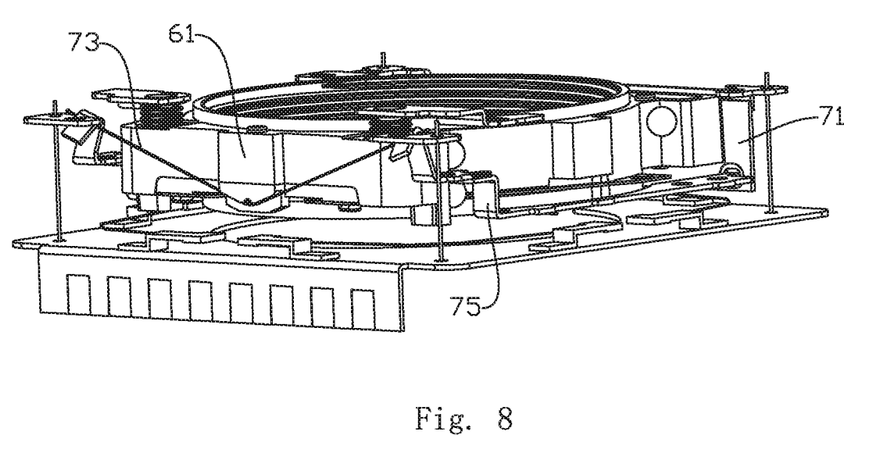
FIG. 8 is similar to FIG. 7 but from another aspect.

Specifically, the focusing shape memory alloy wire 73 is electrically connected with the second circuit board 71 through a conductive metal sheet. Specifically, referring to FIGS. 7 to 8, the conductive metal sheet comprises a first conductive metal sheet 74 positioned at one side of the lens support 61, and a second conductive metal sheet 75 arranged opposite to the first conductive metal sheet 74 and positioned at the other side of the lens support 61. The first conductive metal sheet 74 and the second conductive metal sheet 75 both are electrically connected between the focusing shape memory alloy wire 73 and the second circuit board 71; the second end of the first conductive metal sheet 74 and one end, far away from the second circuit board 71, of the second conductive metal sheet 75 extend to one side, far away from the first circuit board 3, of the lens support 61. The focusing shape memory alloy wire 73 comprises two ends separately connected with the first conductive metal sheet 74 and the second conductive metal sheet 75, and a driving end connected with the lens support 61; and the driving end is arranged at one side, close to the first circuit board 3, of the lens support 61. The focusing shape memory alloy wire 73 can drive the lens support 61 to move along the optical axis direction of the lens when energized, so as to achieve a focusing function.

Figure 1:
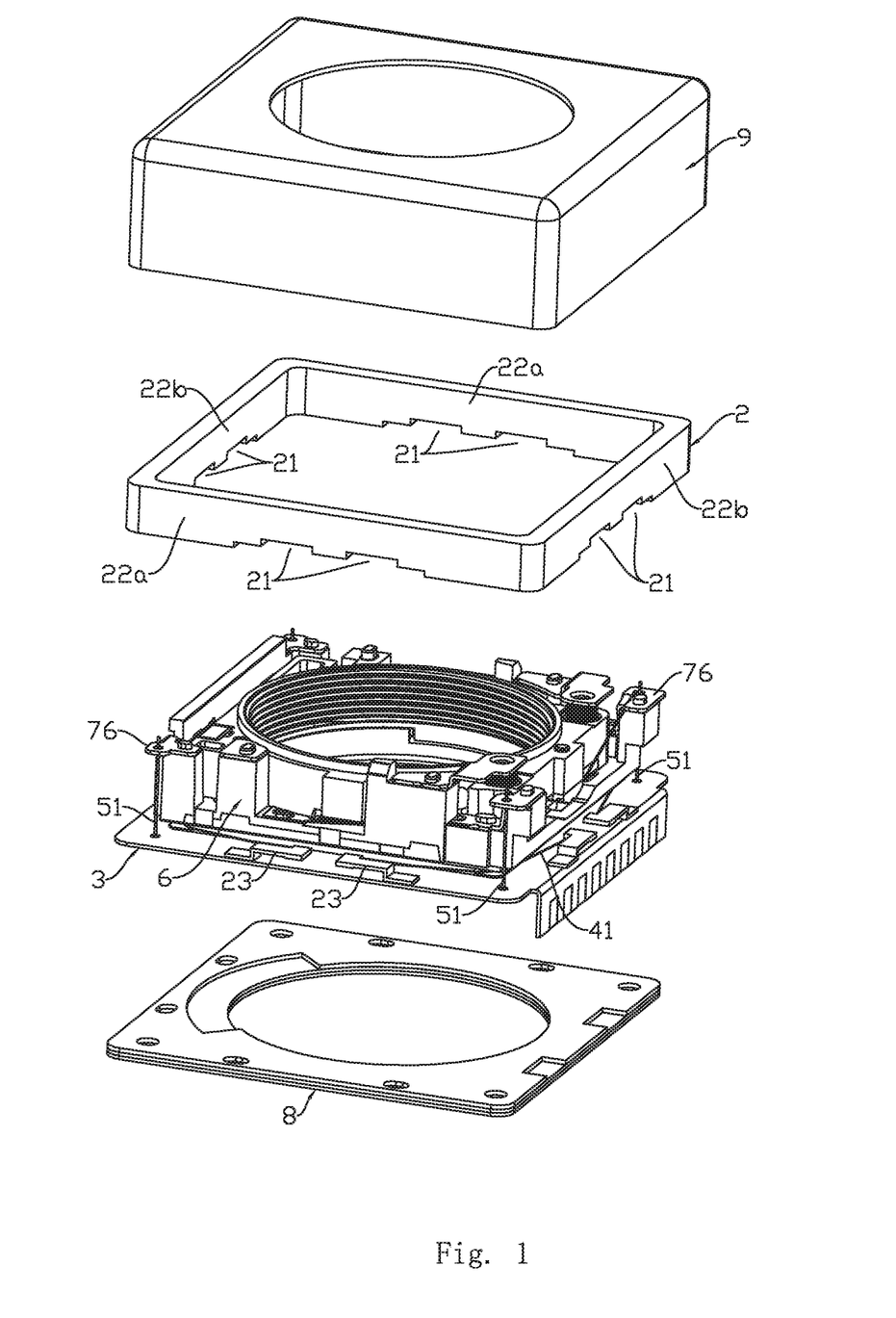

Preferably, referring to FIG. 1, one surface, toward the first circuit board 3, of the frame 2 is provided with concave portions 21 at the positions corresponding to the wire clips 23; and the wire clips 23 are fixed into the corresponding concave portions 21. Preferably, two concave portions 21 are arranged on each side wall 22 of the frame 2 at an interval; and one wire clip 23 is arranged in each concave portion 21.

Preferably, the frame 2 and the lens base 6 both are in a square form. The frame 2 further comprises four corners connected between the adjacent side walls 22. Four corners of the lens base 6 are toward the four corners of the frame 2 separately. That is, diagonal lines of the square frame 2 and the diagonal lines of the square lens base 6 are collinear.

Preferably, referring to FIG. 9, wire slots 631 are formed in the hook parts 63; and the driving ends of the shape memory alloy wires 41 are accommodated into the wire slots 631 separately. The wire slots 631 are formed in the outer sides (namely one sides far away from the center of the lens base 6, namely also one sides toward the frame 2) of the hook parts 63. In this arrangement way, the reliability of the lens module in the invention can be ensured.

Figure 11:
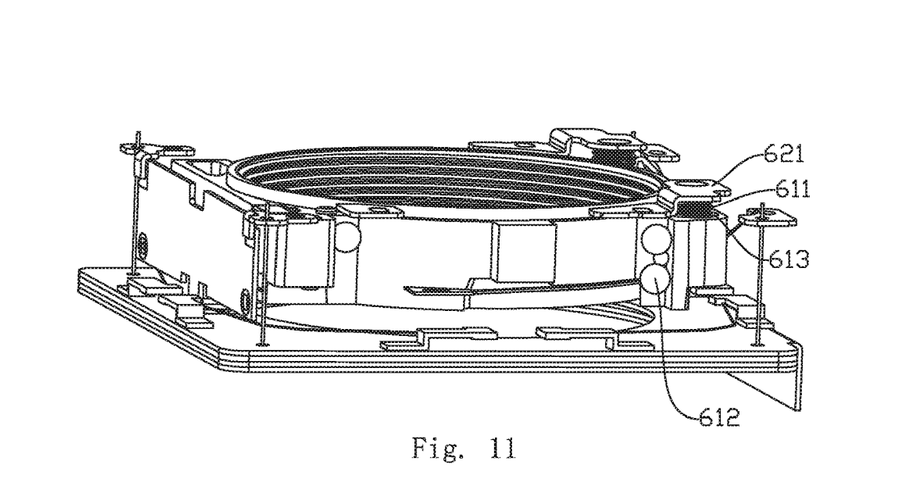
FIG. 11 is another isomeric view of the lens module with a first conductive metal sheet removed.

Preferably, referring to FIGS. 3 and 11, a blocking board 621 is formed at one side, far away from the first circuit board 3, of the base 62 in a manner of extending towards the lens support 61; an accommodation groove 613 is formed in one side, far away from the first circuit board 3, of the lens support 61 along the optical axis direction; an elastic element 611 is accommodated into the accommodation groove 613; one end of the elastic element 611 is accommodated and fixed into the accommodation groove 613 and the other end extends out of the lens support 61 and is propped against the blocking board 621. Specifically, the elastic element 611 is a spring. The focusing shape memory alloy wire 73 is V-shaped. The focusing shape memory alloy wire 73 comprises two fixing ends connected to the support parts 76 and a V-shaped end part positioned between the two fixing ends. The V-shaped driving end of the focusing shape memory alloy wire 73 is in fit contact with the V-shaped end part of the lens support 61. Specifically, a ball assembly 612 for guiding the lens support 61 to slide relative to the base 62 in the optical axis direction of the lens is arranged between the lens support 61 and the base 62.

Figure 10:
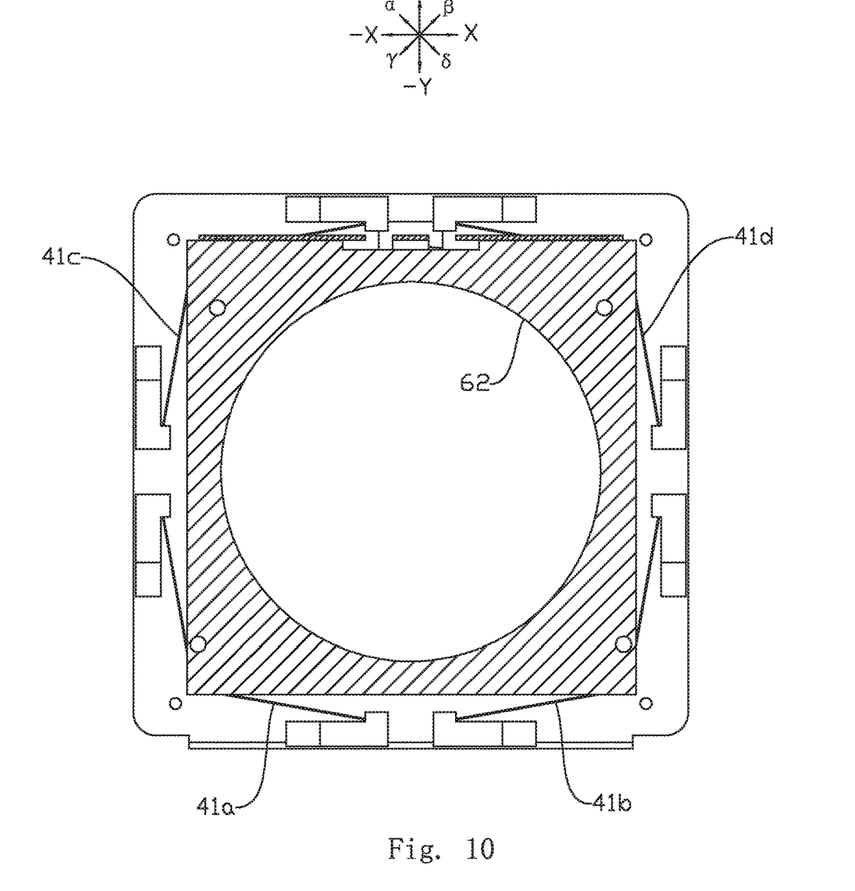
FIG. 10 is a top view of the lens module in FIG. 9.

In the invention, a movement way of the lens base 6 in a plane perpendicular to the optical axis of the lens is as follows:

For convenience of description, in FIG. 10, four shape memory alloy wires 41 are respectively represented by a shape memory alloy wire 41a, a shape memory alloy wire 41b, a shape memory alloy wire 41c and a shape memory alloy wire 41d;

Referring to FIG. 10, when the lens base 6 needs to move in a Y direction, the shape memory alloy wire 41a and the shape memory alloy wire 41b generate a resultant force in the Y direction only by energizing the shape memory alloy wire 41a and the shape memory alloy wire 41b to contract, so as to drive the lens base 6 to move in the Y direction. Similarly, when the lens base 6 needs to move in a −Y direction, the shape memory alloy wire 41c and the shape memory alloy wire 41d generate a resultant force in the −Y direction only by energizing the shape memory alloy wire 41c and the shape memory alloy wire 41d to contract, so as to drive the lens base 6 to move in the −Y direction. The movement principles of the lens base 6 in an X direction and a −X direction are the same as the above and are not repeatedly described here. The X direction, the −X direction, the Y direction and the −Y direction are parallel to four side walls 22 of the frame 2 separately.

Referring to FIG. 10, when the lens base 6 needs to move in an alpha direction, the shape memory alloy wire 41b generates a force in the alpha direction only by energizing the shape memory alloy wire 41b to contract, so as to drive the lens base 6 to move in the alpha direction. Similarly, when the lens base 6 needs to move in a beta direction, the shape memory alloy wire 41a generates a force in the beta direction only by energizing the shape memory alloy wire 41a to contract, so as to drive the lens base 6 to move in the beta direction. The movement principles of the lens base 6 in a gamma direction and a delta direction are the same as the above and are not repeatedly described here. The alpha direction, the beta direction, the gamma direction and the delta direction are the directions in which the centers of the driving ends of the four shape memory alloy wires 41 are toward the center of the lens base 6 separately. When the lens base 6 is in the square form, the alpha direction, the beta direction, the gamma direction and the delta direction are consistent with diagonal line directions of the square.

It is to be understood, however, that even though numerous characteristics and advantages of the present exemplary embodiments have been set forth in the foregoing description, together with details of the structures and functions of the embodiment, the invention is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module, comprising:
a frame having oppositely arranged first side walls and oppositely arranged second side walls connected between the first side walls; the first side walls and the second side walls being enclosed into a ring;
a first circuit board arranged on the frame;
a lens base surrounded by the frame for mounting a lens;
a support device for supporting the lens base on the first circuit board;
and a driving device connected between the first circuit board and the lens base for driving the lens base to move relative to the frame in a direction perpendicular to an optical axis of the lens; wherein
the driving device comprises shape memory alloy wires; each shape memory alloy wire is provided with two ends connected to the frame, and a driving end positioned between the two ends, one end is fixed to one first side wall and the other end is fixed to one adjacent second side wall; and the driving ends are supported on the lens base;
wherein wire clips are arranged on the first side walls and the second side walls respectively;
the wire clips are clamped between the frame and the first circuit board; and the ends of the shape memory alloy wires are respectively fixed by the wire clips and are electrically connected to the first circuit board through the wire clips;
wherein the lens module includes at least two shape memory alloy wires;
wherein the shape memory alloy wires are symmetrically arranged on the periphery of the lens base; the lens base is provided with hook parts corresponding to the driving ends; and the hook parts sleeve the driving ends in a matching manner;
wherein the support device comprises at least two suspending wires extending along an optical axis direction; support parts are formed at one side of the lens base far away from the first circuit board; one end of each suspending wire is fixed to the first circuit board and the other end is fixed to one support part; and the suspending wires are symmetrically arranged on the periphery of the lens base and suspend the lens base in the frame;
wherein the lens base comprises a lens support for mounting the lens and a base for supporting the lens support; the lens support is movably connected relative to the base in the optical axis direction; the support parts and the hook parts are formed at two opposite ends of the base respectively; the lens module further comprises an autofocusing mechanism; the autofocusing mechanism comprises a second circuit board, a conductive wire and a focusing shape memory alloy wire; the second circuit board is arranged on the base and is perpendicular to the first circuit board; two conductive support parts are arranged at one side, close to the second circuit board, of the base; the first circuit board and the second circuit board are electrically connected through the two conductive support parts and the suspending wires close to the two conductive support parts; a signal control conductive wire is also electrically connected between the first circuit board and the second circuit board; the conductive wire is arranged at one side of the first circuit board away from the base; and the focusing shape memory alloy wire is electrically connected with the second circuit board.

2. The lens module as described in claim 1, wherein the frame and the lens base both are in a square form; the hook parts are formed at corners at one side, close to the first circuit board, of the lens base.

3. The lens module as described in claim 1, wherein the lens base is in a square form; and the suspending wires are correspondingly arranged at for corners of the lens base.

4. The lens module as described in claim 3, wherein the four suspending wires all are perpendicular to the first circuit board.

5. The lens module as described in claim 1, wherein one surface of the frame toward the first circuit board is provided with concave portions at the positions corresponding to the wire clips; and the wire clips are fixed into the corresponding concave portions.

6. The lens module as described in claim 1, wherein a plurality of wire slots are formed in the hook parts; and the driving ends of the shape memory alloy wires are accommodated into a plurality of wire slots.

7. The lens module as described in claim 1, wherein each shape memory alloy wire is L-shaped.

8. The lens module as described in claim 7, wherein an included angle formed by each shape memory alloy wire is greater than 90 degrees and smaller than 110 degrees.

9. The lens module as described in claim 1, wherein a blocking board is formed at one side of the base far away from the first circuit board, in a manner of extending towards the lens support; an accommodation groove is formed in one side, far away from the first circuit board, of the lens support along the optical axis direction; an elastic element is accommodated into the accommodation groove; one end of the elastic element is accommodated and fixed into the accommodation groove; and the other end extends out of the lens support and is propped against the blocking board.

10. The lens module as described in claim 9, wherein the focusing shape memory alloy wire is V-shaped and comprises two fixing ends connected to the support parts and a V-shaped driving end positioned between the two fixing ends; a driving convex part is arranged on the lens support and comprises a V-shaped end part; and the V-shaped driving end of the focusing shape memory alloy wire and the V-shaped end part of the lens support are in fit contact.

11. The lens module as described in claim 10, wherein a ball assembly for guiding the lens support to slide relative to the base along the optical axis direction of the lens is arranged between the lens support and the base.

* * * * *